United States Patent
Yamada et al.

(10) Patent No.: US 12,240,868 B2
(45) Date of Patent: Mar. 4, 2025

(54) ORGANIC SILICON COMPOUND AND PRODUCTION METHOD THEREFOR

(71) Applicant: SHIN-ETSU CHEMICAL CO., LTD., Tokyo (JP)

(72) Inventors: Tetsuro Yamada, Annaka (JP); Munenao Hirokami, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 1175 days.

(21) Appl. No.: 17/048,372

(22) PCT Filed: Jan. 22, 2019

(86) PCT No.: PCT/JP2019/001758
§ 371 (c)(1),
(2) Date: Oct. 16, 2020

(87) PCT Pub. No.: WO2019/202795
PCT Pub. Date: Oct. 24, 2019

(65) Prior Publication Data
US 2021/0163512 A1    Jun. 3, 2021

(30) Foreign Application Priority Data

Apr. 17, 2018    (JP) ................. 2018-079153

(51) Int. Cl.
| C07F 7/18 | (2006.01) |
| C08L 83/06 | (2006.01) |
| C09D 183/06 | (2006.01) |
| C09J 183/06 | (2006.01) |

(52) U.S. Cl.
CPC .......... *C07F 7/1804* (2013.01); *C07F 7/1872* (2013.01); *C08L 83/06* (2013.01); *C09D 183/06* (2013.01); *C09J 183/06* (2013.01)

(58) Field of Classification Search
CPC .................................................. C07F 7/1804
See application file for complete search history.

(56) References Cited

U.S. PATENT DOCUMENTS

| 2,567,131 | A | | 9/1951 | Speier | |
| 3,592,833 | A | | 7/1971 | Montigny et al. | |
| 4,141,851 | A | | 2/1979 | Askew et al. | |
| 5,096,991 | A | | 3/1992 | Kozakai | |
| 5,117,027 | A | * | 5/1992 | Bernhardt | C07F 7/1892 556/440 |
| 2008/0255354 | A1 | * | 10/2008 | Popp | C07F 7/1892 544/221 |
| 2009/0156774 | A1 | * | 6/2009 | Ziche | C08G 18/0895 528/28 |

FOREIGN PATENT DOCUMENTS

| EP | 2 289 898 B1 | 5/2017 |
| GB | 686068 A | 1/1953 |
| JP | 51-13130 B1 | 4/1976 |
| JP | 52-65227 A | 5/1977 |
| JP | 3-45629 A | 2/1991 |
| JP | 2004-99908 A | 4/2004 |
| JP | 2007-534811 A | 11/2007 |
| JP | 2008-531634 A | 8/2008 |
| JP | 2010-209205 A | 9/2010 |
| WO | WO 2006/081091 A2 | 6/2006 |
| WO | WO 2008/065134 A1 | 6/2008 |

OTHER PUBLICATIONS

V. Pestunovich et al., 43 Chemistry of Heterocyclic Compounds, 187-297 (2007) (Year: 2007).*
CAS Abstract and Indexed Compound A. Popp et al., US 2008/0255354 (2008) (Year: 2008).*
CAS Abstract and Indexed Compound, V. Mironov et al., 44 Zhurnal Obshchei Khimii, 1496-1501 (1974) (Year: 1974).*
Extended European Search Report for European Application No. 19788571.8, dated Dec. 8, 2021.
Adima et al., "Facile Cleavage of Si—C Bonds during the Sol-Gel Hydrolysis of Aminomethyltrialkoxysilanes—A New Method for the Methylation of Primary Amines," European Journal of Organic Chemistry, vol. 2004, No. 12, 2004, pp. 2582-2588.
Andrianov et al., "Reactions of chloroalkylalkylalkoxysilanes with multivalent alcohols," Russian Journal of General Chemistry, vol. 29, 1959, pp. 3598-3601.
Andrianov et al., "Synthesis of methylethoxysilanes containing in the methyl group either a benzoate or a terephthalate group," Russian Journal of Organic Chemistry, vol. 36, No. 10, 1966, pp. 1848-1850.
Gol'Din et al., "Reaction of diamines with (Chloromethyl) alkoxysilanes," Russian Journal of General Chemistry, vol. 48, No. 1, 1978, pp. 129-131.

(Continued)

*Primary Examiner* — Alexander R Pagano
(74) *Attorney, Agent, or Firm* — Birch, Stewart, Kolasch & Birch, LLP

(57) ABSTRACT

This organic silicon compound is characterized by being represented by structural formula (1), and has good reactivity while having a monoalkoxysilyl group.

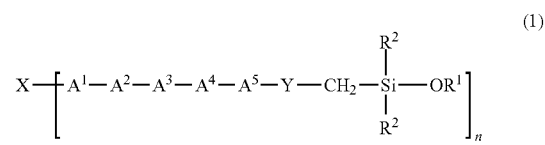

(In the formula, X represents a monovalent to trivalent organic group including a polyoxyalkylene structure, an alkylene group having 1-20 carbon atoms, O, S, N, or the like, $R^1$ and $R^2$ each independently represent an alkyl group or the like having 1-10 carbon atoms, Y represents a single bond, O, S, or the like, $A^1, A^2, A^3, A^4$, and $A^5$ each represent a single bond, or a divalent linking group such as a divalent hydrocarbon group having 1-20 carbon atoms, and n represents a number of 1-3.)

7 Claims, No Drawings

(56) References Cited

OTHER PUBLICATIONS

International Search Report (PCT/ISA/210) issued in PCT/JP2019/001758, dated Mar. 12, 2019.
Lasev, "Synthesis of organosilicon amines and diamines," Russian Journal of General Chemistry, vol. 37, No. 1, 1967, pp. 253-254.
Mironov et al., "Mechanism of the conversion of a-silylamines into 2, 5-disilapiperazines," Russian Journal of General Chemistry, vol. 44, No. 7, 1974, pp. 1496-1501.
Pestunovich et al., "Synthesis of Si-Containing Cyclic Ureas," Chemistry of Heterocyclic Compounds, vol. 43, No. 2, 2007, pp. 187-192.
Written Opinion of the International Searching Authority (PCT/ISA/237) issued in PCT/JP2019/001758, dated Mar. 12, 2019.

\* cited by examiner

ORGANIC SILICON COMPOUND AND PRODUCTION METHOD THEREFOR

TECHNICAL FIELD

This invention relates to an organosilicon compound and a method for preparing the same. More particularly, it relates to an organosilicon compound containing a silicon-bonded monoalkoxy group at the molecular chain end as a silicon group capable of forming a siloxane bond to achieve a molecular weight buildup (also referred to as "reactive silicon group," hereinafter), and a method for preparing the same.

BACKGROUND ART

Since reactive silicon groups, especially alkoxysilyl groups are capable of hydrolytic condensation in the presence of water, polymers having reactive silicon groups can be used as curable compositions adapted to crosslink and cure in the presence of moisture or humidity.

Of such polymers, polymers of polyoxyalkylene backbone are generally known as modified silicones, and polymers of silicon-containing compound backbone are generally known as end-capped silicones.

Curable compositions comprising polymers having reactive silicon groups as typified by the foregoing polymers are characterized by being liquid at room temperature and becoming rubber elastomers upon curing. For utilizing these characteristics, they are widely used as coating agents, adhesives, building sealants and the like.

Nowadays, particularly in the applications of adhesives and building sealants, not only a strong bond is simply required, but an improvement in durability and bond of better quality are also required. For example, when the cured adhesive layer becomes a tough and flexible rubber elastomer which can accommodate the thermal expansion and shrinkage of a substrate and external stresses, there are obtained elastic adhesives which are improved in durability and reliability.

A number of proposals were made on the method for preparing polymers having reactive silicon groups at molecular chain ends. Some have been used for industrial manufacture.

For example, as the compound having a polyoxyalkylene group in the backbone and an alkoxysilyl group at molecular chain end, polymers of polyoxypropylene backbone having methyldimethoxysilyl groups bonded at both molecular chain ends are known. As a typical example of such polymers, room temperature curable compositions comprising an alkoxysilyl-end-capped polyoxyalkylene based compound as the main component or base polymer are known from Patent Documents 1 and 2.

The room temperature curable compositions of Patent Documents 1 and 2, however, have the problem that since crosslinking reaction takes place under the impetus of moisture curing of methyldimethoxysilyl or trimethoxysilyl groups, cured products after moisture curing have a high crosslinking density and are susceptible to cracking or peeling.

On the other hand, when a compound having a dimethylmonomethoxysilyl group is used in combination for the purpose of reducing the crosslinking density, there arises the problem of cure failure because the reactivity of dimethylmonomethoxysilyl group is very low.

PRIOR ART DOCUMENTS

Patent Documents

Patent Document 1: JP-A 2004-099908
Patent Document 2: JP-A 2010-209205

SUMMARY OF INVENTION

Technical Problem

An object of the invention, which has been made under the above-mentioned circumstances, is to provide an organosilicon compound containing a monoalkoxysilyl group and yet having a high reactivity, and a method for preparing the same.

Solution to Problem

Making extensive investigations to attain the above object, the inventors have found a specific organosilicon compound containing a specific heteroatom-methylene-silyl linkage as a linking group with a monoalkoxysilyl group at a molecular chain end, and a method for preparing the same, and that a composition comprising the organosilicon compound has high reactivity and gives a cured product having excellent flexibility and is suited as a curable composition for forming such materials as coating agents, adhesives and sealants. The invention is predicated on this finding.

The invention is as defined below.
1. An organosilicon compound having the structural formula (1):

[Chem. 1]

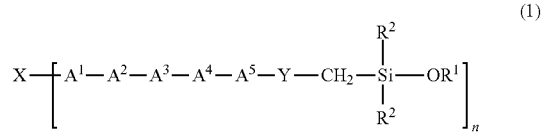

wherein $R^1$ is a substituted or unsubstituted $C_1$-$C_{10}$ alkyl group or substituted or unsubstituted $C_6$-$C_{10}$ aryl group,
$R^2$ is each independently a substituted or unsubstituted $C_1$-$C_{10}$ alkyl group or substituted or unsubstituted $C_6$-$C_{10}$ aryl group,
n indicative of the valence of X is a number of 1 to 3,
X is a mono- to trivalent group selected from among a mono- to trivalent organic group containing polyoxyalkylene structure, substituted or unsubstituted $C_1$-$C_{20}$ alkylene group, substituted or unsubstituted $C_7$-$C_{20}$ aralkylene group, substituted or unsubstituted $C_6$-$C_{20}$ arylene group, isocyanurate, triazine, O, S, N, $N(R^3)$, and $N(R^3)_2$,
$R^3$ is each independently hydrogen, a substituted or unsubstituted $C_1$-$C_{10}$ alkyl group, or substituted or unsubstituted $C_6$-$C_{10}$ aryl group, groups $R^3$ may bond together to form a substituted or unsubstituted $C_1$-$C_{10}$ alkylene group or substituted or unsubstituted $C_6$-$C_{20}$ arylene group,
Y is a single bond, O, S, or $N(R^4)$,
$R^4$ is hydrogen, a substituted or unsubstituted $C_1$-$C_{10}$ alkyl group, or substituted or unsubstituted $C_6$-$C_{10}$ aryl group, and when X is di- or trivalent, $R^4$ in two groups $N(R^4)$ may bond together to form a substituted or unsubstituted $C_1$-$C_{10}$ alkylene group or substituted or unsubstituted $C_6$-$C_{20}$ arylene group, $A^1$, $A^2$, $A^3$, $A^4$ and $A^5$ each are a single bond, a substituted or unsubstituted $C_1$-$C_{20}$ divalent hydrocarbon group, or a divalent linking group containing a heteroatom, with the proviso that Y is O, S or $N(R^4)$ when X is a mono- to trivalent organic group containing polyoxyalkylene structure, substituted or unsubstituted $C_1$-$C_{20}$ alkylene group, substituted or unsubstituted $C_7$-$C_{20}$ aralkylene group, substituted or unsubstituted $C_6$-$C_{20}$ arylene group, isocyanurate, or triazine, and $A^1$, $A^2$, $A^3$, $A^4$, $A^5$, and Y are single bonds when X is O, S, N, $N(R^3)$, or $N(R^3)_2$.

2. The organosilicon compound of 1 having the structural formula (2):

[Chem. 2]

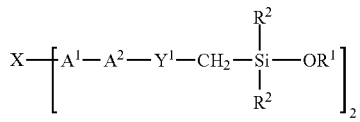
(2)

wherein $R^1$, $R^2$, $A^1$ and $A^2$ are as defined above, $X^1$ is a divalent organic group containing polyoxyalkylene structure, substituted or unsubstituted $C_1$-$C_{20}$ alkylene group, substituted or unsubstituted $C_7$-$C_{20}$ aralkylene group, or substituted or unsubstituted $C_6$-$C_{20}$ arylene group, $Y^1$ is O, S or $N(R^4)$, $R^4$ is as defined above.

3. The organosilicon compound of 1 or 2 having the structural formula (3):

[Chem. 3]

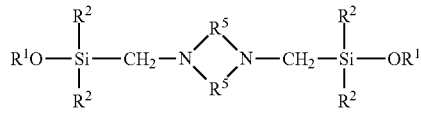
(3)

wherein $R^1$ and $R^2$ are as defined above, and $R^5$ is a substituted or unsubstituted $C_1$-$C_{10}$ alkylene group.

4. The organosilicon compound of 1 having the structural formula (4):

[Chem. 4]

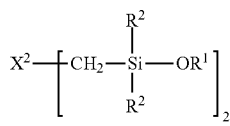
(4)

wherein $R^1$ and $R^2$ are as defined above, $X^2$ is O, S or $N(R^3)$, $R^3$ is as defined above.

5. A method for preparing the organosilicon compound of 1 or 2, comprising the step of reacting an isocyanate-containing compound having the structural formula (5):

[Chem. 5]

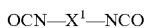
OCN—$X^1$—NCO (5)

wherein $X^1$ is a divalent organic group containing polyoxyalkylene structure, substituted or unsubstituted $C_1$-$C_{20}$ alkylene group, substituted or unsubstituted $C_7$-$C_{20}$ aralkylene group, or substituted or unsubstituted $C_6$-$C_{20}$ arylene group, with a compound having the formula (6):

[Chem. 6]

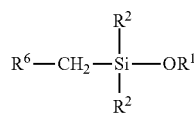
(6)

wherein $R^1$ and $R^2$ are as defined above, and $R^6$ is a group containing a mercapto, amino or diamino group.

6. A method for preparing the organosilicon compound of 1 or 2, comprising the step of reacting a compound having the structural formula (7):

[Chem. 7]

$Y^2$—$X^1$—$Y^2$ (7)

wherein $X^1$ is a divalent organic group containing polyoxyalkylene structure, substituted or unsubstituted $C_1$-$C_{20}$ alkylene group, substituted or unsubstituted $C_7$-$C_{20}$ aralkylene group, or substituted or unsubstituted $C_6$-$C_{20}$ arylene group, and $Y^2$ is a group containing a hydroxyl, mercapto or amino group, with a compound having the formula (8):

[Chem. 8]

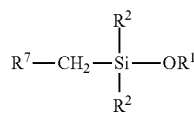
(8)

wherein $R^1$ and $R^2$ are as defined above, and $R^7$ is a leaving group selected from among chlorine, bromine, iodine, methansulfonate, trifluoromethanesulfonate, and p-toluenesulfonate, or a (meth)acryloyloxy group.

7. A method for preparing the organosilicon compound of 3, comprising the step of reacting a compound having the structural formula (9):

[Chem. 9]

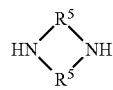
(9)

wherein $R^5$ is as defined above, with a compound having the formula (8):

[Chem. 10]

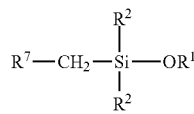
(8)

wherein $R^1$ and $R^2$ are as defined above, and $R^7$ is a leaving group selected from among chlorine, bromine, iodine, methanesulfonate, trifluoromethanesulfonate, and p-toluenesulfonate, or a (meth)acryloyloxy group.

8. A method for preparing the organosilicon compound of 4, comprising the step of reacting a compound having the structural formula (10):

[Chem. 11]

$$M\text{-}X^2\text{-}M \quad (10)$$

wherein $X^2$ is as defined above and M is hydrogen or alkali metal, with a compound having the formula (8):

[Chem. 12]

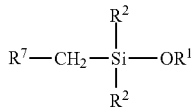

(8)

wherein $R^1$, $R^2$ and $R^7$ are as defined above.

9. A curable composition comprising the organosilicon compound of any one of 1 to 4.

10. The curable composition of 9, further comprising a curing catalyst.

11. The curable composition of 10 wherein the curing catalyst is an amine base compound.

12. A coating agent comprising the curable composition of any one of 9 to 11.

13. An adhesive comprising the curable composition of any one of 9 to 11.

14. A cured article obtained by curing the curable composition of any one of 9 to 11.

15. A cured article comprising a coating layer obtained by curing the coating agent of 12.

16. A cured article comprising an adhesive layer obtained by curing the adhesive of 13.

Advantageous Effects of Invention

The organosilicon compound of the invention contains a monoalkoxysilyl group and yet has a high reactivity. A composition comprising the organosilicon compound gives a cured product having excellent flexibility.

The inventive compound having such properties is advantageously used in such applications as coating agents, adhesives and sealants.

DESCRIPTION OF EMBODIMENTS

Now the invention is described in detail.

The invention provides an organosilicon compound having the structural formula (1).

[Chem. 13]

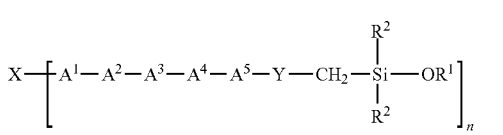

(1)

In formula (1), $R^1$ is a substituted or unsubstituted $C_1$-$C_{10}$, preferably $C_1$-$C_4$ alkyl group or a substituted or unsubstituted $C_6$-$C_{10}$ aryl group. $R^2$ is each independently a substituted or unsubstituted $C_1$-$C_{10}$, preferably $C_1$-$C_4$ alkyl group or a substituted or unsubstituted $C_6$-$C_{10}$ aryl group.

The $C_1$-$C_{10}$ alkyl groups represented by $R^1$ and $R^2$ may be straight, branched or cyclic, and examples thereof include straight or branched alkyl groups such as methyl, ethyl, n-propyl, i-propyl, n-butyl, s-butyl, t-butyl, n-pentyl, neopentyl, n-hexyl, n-heptyl, n-octyl, n-nonyl, and n-decyl, and cycloalkyl groups such as cyclopropyl, cyclobutyl, cyclopentyl, cyclohexyl, cycloheptyl, cyclooctyl, and isobornyl.

Examples of the $C_6$-$C_{10}$ aryl group include phenyl, tolyl, xylyl, α-naphthyl, and β-naphthyl.

In the foregoing groups, some or all of the hydrogen atoms may be substituted by alkyl moieties, aryl moieties, halogen atoms such as F, Cl and Br, or cyano moieties, and examples thereof include 3-chloropropyl, 3,3,3-trifluoropropyl, and 2-cyanoethyl.

Of these, $R^1$ and $R^2$ are preferably selected from methyl, ethyl, and phenyl, with methyl being most preferred from the aspects of reactivity, availability, productivity, and cost.

In formula (1), X is a mono- to trivalent group selected from among a mono- to trivalent organic group containing polyoxyalkylene structure, a substituted or unsubstituted $C_1$-$C_{20}$, preferably $C_1$-$C_{10}$ alkylene group, a substituted or unsubstituted $C_7$-$C_{20}$ aralkylene group, a substituted or unsubstituted $C_6$-$C_{20}$ arylene group, isocyanurate, triazine, O, S, N (trivalent), $N(R^3)$ (divalent), and $N(R^3)_2$ (monovalent).

Examples of the $C_1$-$C_{20}$ alkylene group X include straight or branched alkylene groups such as methylene, ethylene, trimethylene, propylene, tetramethylene, isobutylene, dimethyl ethylene, pentamethylene, 2,2-dimethyltrimethylene, hexamethylene, heptamethylene, octamethylene, nonamethylene, and decylene (decamethylene), and cycloalkylene groups such as cyclopentylene and cyclohexylene.

The $C_1$-$C_{20}$ alkylene group may be a divalent group having a chainlike moiety and a cyclic moiety commonly, as shown by the following formula (i).

[Chem. 14]

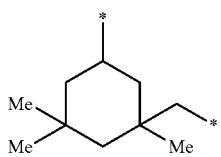

(i)

Herein Me stands for methyl, and * designates a valence bond.

Examples of the $C_7$-$C_{20}$ aralkylene group X include methylenebisphenylene, dimethylmethylenebisphenylene, ethylenebisphenylene, and tetramethylenebisphenylene.

Examples of the $C_6$-$C_{20}$ arylene group X include 1,2-phenylene, 1,3-phenylene, 1,4-phenylene, oxybisphenylene, sulfonebisphenylene, toluenediyl, xylenediyl, and naphthalenediyl.

In these groups, some or all of the hydrogen atoms may be substituted by alkyl moieties, aryl moieties, halogen atoms such as F, Cl and Br, or cyano moieties, and examples thereof include 3-chlorotrimethylene, 2,3,3-trifluorotrimethylene, 2-chloro-1,4-phenylene, and difluoromethylenebisphenylene.

Examples of the isocyanurate or triazine X include trivalent groups containing isocyanurate or triazine structure, as shown by the following formula (ii).

[Chem. 15]

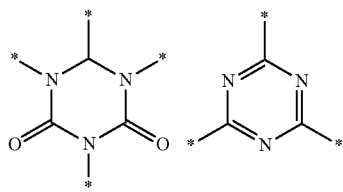

(ii)

Herein * designates a valence bond.

In the mono- to trivalent organic group containing polyoxyalkylene structure, represented by X, the polyoxyalkylene structure may have a straight, branched or cyclic structure. The straight polyoxyalkylene structure is preferred from the standpoints of mechanical properties of the cured product and shelf stability of the composition.

As used herein, the "straight" polyoxyalkylene structure means that divalent oxyalkylene groups which are repeating units to constitute the polyoxyalkylene structure are linked straight. Each oxyalkylene group itself may be straight or branched (e.g., propyleneoxy group such as —$CH_2CH(CH_3)O$—).

Of the foregoing mono- to trivalent organic groups containing polyoxyalkylene structure, preference is given to a straight structure having repeating units as shown by the structural formula (iii).

[Chem. 16]

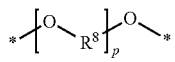

(iii)

Herein * designates a valence bond.

In formula (iii), $R^8$ is a divalent hydrocarbon group, preferably divalent aliphatic hydrocarbon group, with no particular other limitation. Inter alia, $C_1$-$C_{14}$ straight or branched alkylene groups are preferred, with $C_2$-$C_4$ straight or branched alkylene groups being more preferred. Examples of the alkylene group are as exemplified above for the $C_1$-$C_{20}$ alkylene group X.

The subscript p is an integer of at least 1. It is preferred from the standpoints of mechanical properties of the cured product and workability of the composition that p be an integer of 1 to 1,000, more preferably 1 to 500, even more preferably 2 to 100. Understandably, when p is 2 or more, a plurality of $R^8$ may be the same or different.

Examples of the unit: —$OR^8$— in formula (iii) include —$OCH_2$—, —$OCH_2CH_2$—, —$OCH_2CH_2CH_2$—, —$OCH_2CH(CH_3)$—, —$OCH_2CH(CH_2CH_3)$—, —$OCH_2C(CH_3)_2$—, and —$OCH_2CH_2CH_2CH_2$—.

Herein, the backbone skeleton of the above polyoxyalkylene structure may consist of repeating units of one type having formula (iii) or repeating units of more than one type having formula (iii). When the inventive compound is used in such materials as coating agents, adhesives and sealants, polymers composed mainly of ethylene oxide (—$OCH_2CH_2$—) or propylene oxide (—$CH_2CH(CH_3)O$—) are preferred in view of durability.

When X is —$N(R^3)$— or —$N(R^3)_2$, $R^3$ therein is each independently hydrogen, a substituted or unsubstituted $C_1$-$C_{10}$ alkyl group or a substituted or unsubstituted $C_6$-$C_{10}$ aryl group. Groups $R^3$ may bond together to form a substituted or unsubstituted $C_1$-$C_{10}$ alkylene group or substituted or unsubstituted $C_6$-$C_{20}$ arylene group.

Examples of the $C_1$-$C_{10}$ alkyl group or $C_6$-$C_{10}$ aryl group $R^3$ are as exemplified above for $R^1$. Examples of the $C_1$-$C_{10}$ alkylene group formed by bonding of $R^3$ together include such groups as exemplified above for X, but of 1 to 10 carbon atoms.

Examples of the $C_6$-$C_{20}$ arylene group include such arylene groups as 1,2-phenylene, 1,3-phenylene, 1,4-phenylene, oxybisphenylene, sulfonebisphenylene, toluenediyl, xylenediyl, and naphthalenediyl.

Particularly when groups $R^3$ bond together to form a ring, each $R^3$ is preferably methylene or ethylene (that is, the alkylene group resulting from bonding of $R^3$ together is ethylene, trimethylene or tetramethylene), with methylene (ethylene as the alkylene group) being more preferred from the aspects of reactivity, availability, productivity and cost.

Among others, X is preferably ethylene, hexamethylene, methylenebisphenylene, 1,4-phenylene, toluenediyl, naphthalenediyl, divalent group having formula (i), S, N, $N(R^3)$, or divalent organic group containing polyoxyalkylene structure. From the aspects of reactivity, availability, productivity and cost, and environmental considerations, X is more preferably ethylene, hexamethylene, divalent group having formula (i), S, N, $N(R^3)$, or divalent organic group containing polyoxyalkylene structure.

In formula (1), Y is a single bond, O, S, or $N(R^4)$.

$R^4$ is hydrogen, a substituted or unsubstituted $C_1$-$C_{10}$, preferably $C_1$-$C_6$ alkyl group or a substituted or unsubstituted $C_6$-$C_{10}$, preferably $C_6$ aryl group. When X is di- or trivalent, $R^4$ in two groups $N(R^4)$ may bond together to form a substituted or unsubstituted $C_1$-$C_{10}$ alkylene group or substituted or unsubstituted $C_6$-$C_{20}$ arylene group.

For example, when X is divalent, $R^4$ on nitrogen atoms on opposite sides of X may bond together to form an alkylene group or the like, as shown by the following formula.

[Chem. 17]

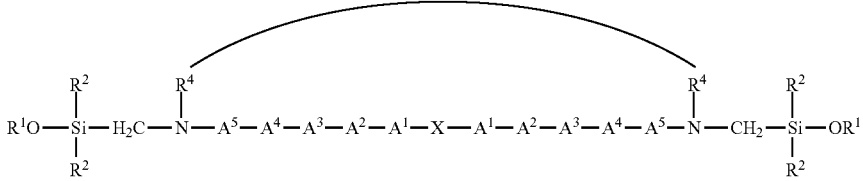

Examples of the alkyl and aryl groups represented by $R^4$ are as exemplified above for $R^1$ and $R^2$. Examples of the $C_1$-$C_{10}$ alkylene group which is formed when $R^4$ bond together are as exemplified above for X, but of 1 to 10 carbon atoms. Examples of the $C_6$-$C_{20}$ arylene group which is formed when $R^4$ bond together are as exemplified above for $R^3$.

Particularly when $R^4$ bond together to form a ring, each $R^4$ is preferably methylene or ethylene (that is, the alkylene group resulting from bonding of $R^4$ together is ethylene, trimethylene or tetramethylene), with methylene (ethylene as the alkylene group) being more preferred from the aspects of reactivity, availability, productivity and cost.

In formula (1), $A^1$, $A^2$, $A^3$, $A^4$ and $A^5$ each are a single bond, a substituted or unsubstituted $C_1$-$C_{20}$, preferably $C_1$-$C_8$ divalent hydrocarbon group, or a divalent linking group containing a heteroatom.

Examples of the $C_1$-$C_{20}$ divalent hydrocarbon group represented by $A^1$, $A^2$, $A^3$, $A^4$ and $A^5$ include alkylene groups such as methylene, ethylene, trimethylene, propylene, isopropylene, tetramethylene, isobutylene, pentamethylene, hexamethylene, heptamethylene, octamethylene, nonamethylene, decamethylene, undecamethylene, dodecamethylene, tridecamethylene, tetradecamethylene, pentadecamethylene, hexadecamethylene, heptadecamethylene, octadecamethylene, nonadecamethylene, and eicosadecylene; cycloalkylene groups such as cyclopentylene and cyclohexylene; and arylene groups such as phenylene, α- and β-naphthylene.

In the foregoing groups, some or all of the hydrogen atoms may be substituted by alkyl moieties, aryl moieties, halogen atoms such as F, Cl, Br and I, or cyano moieties, and examples thereof include 2-chloroethylene, 2-bromoethylene, 2-chloropropylene, 2-bromopropylene, 1-chloromethylethylene, 1-bromomethylethylene, 2-chlorooctamethylene, 2-bromooctamethylene, 1-chloromethylheptamethylene, and 1-bromomethylheptamethylene.

Of these, a single bond, methylene, ethylene, trimethylene, isopropylene, octamethylene, 2-bromoethylene, 2-bromopropylene, 1-bromomethylethylene, 2-bromooctamethylene, and 1-bromomethylheptamethylene are preferred. A single bond, ethylene, trimethylene, isopropylene, 2-bromoethylene, and 2-bromopropylene are more preferred. A single bond, ethylene, isopropylene, and 2-bromoethylene are even more preferred.

Examples of the heteroatom-containing divalent linking group represented by $A^1$, $A^2$, $A^3$, $A^4$ and $A^5$ include an ether bond (—O—), thioether bond (—S—), amino bond (—NH— or —N($R^3$)— wherein $R^3$ is as defined above, and when a plurality of —N($R^3$)— are present, $R^3$ may bond together to form the aforementioned group), sulfonyl bond (—S(=O)$_2$—), phosphinyl bond (—P(=O)OH—), oxo bond (—C(=O)—), thiooxo bond (—C(=S)—), ester bond (—C(=O)O—), thioester bond (—C(=O)S—), thionoester bond (—C(=S)O—), dithioester bond (—C(=S)S—), carbonate bond (—OC(=O)O—), thiocarbonate bond (—OC(=S)O—), amide bond (—C(=O)NH—), thioamide bond (—C(=S)NH—), urethane bond (—OC(=O)NH—), thiourethane bond (—SC(=O)NH—), thionourethane bond (—OC(=S)NH—), dithiourethane bond (—SC(=S)NH—), urea bond (—NHC(=O)NH—), and thiourea bond (—NHC(=S)NH—).

Of these, $A^1$, $A^2$, $A^3$, $A^4$ and $A^5$ are preferably a single bond, amino bond (—NH—, —N($R^3$)—) or oxo bond (—C(=O)—).

Notably, a combination to form a consecutive oxygen structure: —O—O— is excluded from the divalent group formed by $A^1$, $A^2$, $A^3$, $A^4$, $A^5$ and Y.

It is noted that Y is O, S, or N($R^4$) when X is a mono- to trivalent organic group containing polyoxyalkylene structure, substituted or unsubstituted $C_1$-$C_{20}$ alkylene group, substituted or unsubstituted $C_7$-$C_{20}$ aralkylene group, substituted or unsubstituted $C_6$-$C_{10}$ arylene group, isocyanurate, or triazine, and that $A^1$, $A^2$, $A^3$, $A^4$, $A^5$, and Y are single bonds when X is O, S, N, N($R^3$), or N($R^3$)$_2$.

The subscript n is indicative of the valence of X, that is, an average number of hydrolyzable groups per molecule of the organosilicon compound.

The average number (n) per molecule is 1 to 3, preferably 2 to 3, more preferably 2. If n is less than 1, a compound is less reactive because of shortage of hydrolyzable groups, so that a composition comprising the same is less curable or a cured product thereof has insufficient mechanical properties.

On the other hand, if n is more than 3, there are more reaction sites and the crosslinking density becomes too high, so that a composition comprising the organosilicon compound becomes poor in shelf stability and a cured product thereof is susceptible to cracking or may fail to exhibit satisfactory mechanical properties.

Accordingly, the organosilicon compound of the invention is preferably one having the following structural formula (2). On use of such organosilicon compound, the resulting composition has better shelf stability and the cured product has better mechanical properties.

[Chem. 18]

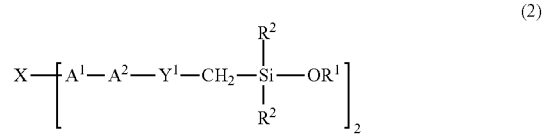

(2)

In formula (2), $R^1$, $R^2$, $A^1$ and $A^2$ are as defined above.

$X^1$ is a divalent organic group containing polyoxyalkylene structure, substituted or unsubstituted $C_1$-$C_{20}$ alkylene group, substituted or unsubstituted $C_7$-$C_{20}$ aralkylene group, or substituted or unsubstituted $C_6$-$C_{20}$ arylene group. Examples of these groups are as exemplified above for X.

$Y^1$ is O, S or N($R^4$). It is preferred from the standpoint of reactivity of the organosilicon compound that $Y^1$ be N($R^4$) and especially wherein $R^4$ bond together to form a substituted or unsubstituted $C_1$-$C_{10}$ alkylene group. Examples of $R^4$ are as exemplified above.

Especially from the standpoint of curability of a composition comprising the organosilicon compound and mechanical properties of a cured product thereof, $X^1$ is preferably a substituted or unsubstituted $C_1$-$C_{20}$ alkylene group, more preferably $C_1$-$C_6$ alkylene group, even more preferably methylene, ethylene or trimethylene.

Also preferably $A^1$ and $A^2$ are single bonds.

That is, the organosilicon compound of the invention is more preferably one having the following structural formula (3). On use of such organosilicon compound, the resulting composition has further better shelf stability and the cured product has further better mechanical properties.

[Chem. 19]

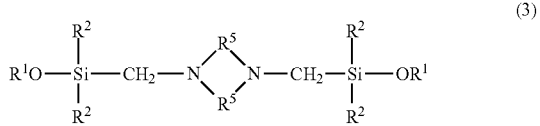

(3)

In formula (3), $R^1$ and $R^2$ are each independently as defined above.

$R^5$ is each independently a substituted or unsubstituted $C_1$-$C_{10}$ alkylene group, preferably $C_1$-$C_3$ alkylene group.

Examples of $R^5$ are as exemplified above for the substituted or unsubstituted $C_1$-$C_{20}$ alkylene group X. Inter alia, $R^5$ is preferably methylene, ethylene or trimethylene, with ethylene being more preferred from the aspects of reactivity, availability, productivity, and cost.

Also, organosilicon compounds having the following structural formula (4) are preferable. On use of such organosilicon compound, the resulting composition has further better shelf stability and the cured product has further better mechanical properties.

[Chem. 20]

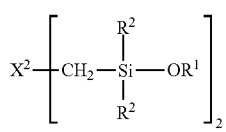

(4)

In formula (4), $R^1$ and $R^2$ are each independently as defined above.

$X^2$ is O, S or $N(R^3)$. From the standpoint of reactivity, $X^2$ is preferably S or $N(R^3)$. Examples of $R^3$ are as exemplified above.

The organosilicon compound having formula (1) may be prepared, for example, by reacting an isocyanate-containing compound having the structural formula (5) below with a compound having a functional group capable of reacting with an isocyanate group and a monoalkoxysilyl group (referred to as "monoalkoxysilane I," hereinafter), represented by the formula (6) below.

[Chem. 21]

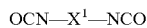

OCN—$X^1$—NCO     (5)

Herein $X^1$ is as defined above.

[Chem. 22]

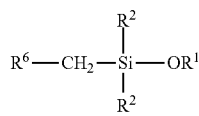

(6)

Herein $R^1$ and $R^2$ are as defined above. $R^6$ is a functional group capable of reacting with an isocyanate group, the functional group being selected from mercapto, amino and diamino groups.

Examples of the isocyanate-containing compound having formula (5) include hexamethylene diisocyanate, cyclohexane diisocyanate, isophorone diisocyanate, diphenylmethane diisocyanate, 4,4'-bis(isocyanatomethyl)diphenylmethane, phenylene diisocyanate, toluene diisocyanate, xylene diisocyanate, tetramethylxylene diisocyanate, and naphthalene diisocyanate. Of these, hexamethylene diisocyanate, cyclohexane diisocyanate, isophorone diisocyanate, diphenylmethane diisocyanate, toluene diisocyanate, and xylene diisocyanate are preferred from the aspects of reactivity, availability, productivity and cost, with hexamethylene diisocyanate and isophorone diisocyanate being more preferred.

In monoalkoxysilane I having formula (6), $R^6$ is a group containing a functional group capable of reacting with an isocyanate group. While the functional group is not particularly limited in structure as long as it is capable of reacting with an isocyanate group, it is specifically selected from mercapto, amino and diamino groups, with mercapto and diamino groups being preferred.

Examples of monoalkoxysilane I having formula (6) include, but are not limited to, mercaptomethyldimethylmethoxysilane, mercaptomethyldimethylethoxysilane, aminomethyldimethylmethoxysilane, aminomethyldimethylethoxysilane, N-methylaminomethyldimethylmethoxysilane, N-methylaminomethyldimethylethoxysilane, N-ethylaminomethyldimethylmethoxysilane, N-ethylaminomethyldimethylethoxysilane, N-propylaminomethyldimethylmethoxysilane, N-propylaminomethyldimethylethoxysilane, N-butylaminomethyldimethylmethoxysilane, N-butylaminomethyldimethylethoxysilane, N-hexylaminomethyldimethylmethoxysilane, N-hexyl aminomethyldimethylethoxysilane, N-octylaminomethyldimethylmethoxysilane, N-octylaminomethyldimethylethoxysilane, N-phenylaminomethyldimethylmethoxysilane, N-phenylaminomethyldimethylethoxysilane, N-(dimethylmethoxysilylmethyl)piperadine, N-(dimethylethoxysilylmethyl)piperadine, N-(dimethylmethoxysilylmethyl)imidazolidine, N-(dimethylethoxysilylmethyl)imidazolidine, N,N'-dimethyl-N-(dimethylmethoxysilylmethyl)ethylenedi amine, N,N'-dimethyl-N-(dimethylethoxysilylmethyl)ethylenediamine, N,N'-di-t-butyl-N-(dimethylmethoxysilylmethyl)ethylenediamine, N,N'-di-t-butyl-N-(dimethylethoxysilylmethyl)ethylenediamine, N,N'-diphenyl-N-(dimethylmethoxysilylmethyl)ethylenediamine, and N,N'-diphenyl-N-(dimethylethoxysilylmethyl)ethylenediamine. Any of monoalkoxysilanes I having formula (6) may be used.

Of these, mercaptomethyldimethylmethoxysilane, N-butylaminomethyldimethylmethoxysilane, N-octylaminomethyldimethylmethoxysilane, N-phenylaminomethyldimethylmethoxysilane, and N-(dimethylmethoxysilylmethyl)piperadine are preferred from the aspect of hydrolysis, with mercaptomethyldimethylmethoxysilane, N-butylaminomethyldimethylmethoxysilane, N-phenylaminomethyldimethylmethoxysilane, and N-(dimethylmethoxysilylmethyl)piperadine being more preferred.

The method for reacting monoalkoxysilane I having formula (6) with the isocyanate-containing compound having formula (5) is not particularly limited, and a choice may be made among well-known methods commonly used in urethanation reaction.

Specifically, in the reaction of monoalkoxysilane I having formula (6) with the isocyanate-containing compound having formula (5), it is preferred from the aspects of restraining by-products during urethanation reaction and enhancing the shelf stability and other properties of the resulting organosilicon compound to adjust the reaction proportion such that the isocyanate-containing compound having formula (5) gives 0.1 to 2.0 moles, more preferably 0.4 to 1.5 moles, even more preferably 0.8 to 1.2 moles of isocyanate groups per mole of the functional group capable of reacting with an isocyanate group in monoalkoxysilane I having formula (6).

Although there is no need for catalyst during the urethanation reaction, a catalyst may be used for accelerating the reaction rate.

The catalyst may be selected from those commonly used in urethanation reaction, and examples thereof include dibutyltin oxide, dioctyltin oxide, tin(II) bis(2-ethylhexanoate), dibutyltin dilaurate, and dioctyltin dilaurate.

The catalyst may be used in a catalytic amount, typically in an amount of 0.001 to 1% by weight based on the total of monoalkoxysilane I having formula (6) and the isocyanate-containing compound having formula (5).

In the urethanation reaction, a solvent having no detrimental impact on the reaction may be used.

Examples include hydrocarbon solvents such as pentane, hexane, heptane, octane, decane and cyclohexane; aromatic solvents such as benzene, toluene and xylene; ketone solvents such as acetone, methyl ethyl ketone, and methyl isobutyl ketone; amide solvents such as formamide, N,N-dimethylformamide, pyrrolidone, and N-methylpyrrolidone; ester solvents such as ethyl acetate, butyl acetate, γ-butyrolactone, and propylene glycol 1-monomethyl ether 2-acetate; and ether solvents such as diethyl ether, dibutyl ether, cyclopentyl methyl ether, tetrahydrofuran, and 1,4-dioxane, which may be used alone or in admixture of two or more.

The temperature during the urethanation reaction is preferably 0 to 90° C., more preferably 25 to 80° C. from the aspects of providing an adequate reaction rate and controlling side reactions such as allophanation, though not particularly limited.

The reaction time is typically 10 minutes to 24 hours, though not particularly limited.

Also, the organosilicon compound having formula (1) may be prepared by reacting a compound having a hydroxyl, mercapto or amino group, represented by the structural formula (7) with a compound having a functional group capable of reacting with a hydroxyl, mercapto or amino group and a monoalkoxysilyl group (referred to as "monoalkoxysilane II," hereinafter), represented by the formula (8).

[Chem. 23]

$$Y^2\text{—}X^1\text{—}Y^2 \quad (7)$$

Herein $X^1$ is as defined above. $Y^2$ is a group containing a hydroxyl, mercapto or amino group.

[Chem. 24]

$$R^7\text{—}CH_2\text{—}\underset{\underset{R^2}{|}}{\overset{\overset{R^2}{|}}{Si}}\text{—}OR^1 \quad (8)$$

Herein $R^1$ and $R^2$ are as defined above. $R^7$ is a leaving group selected from among chlorine, bromine, iodine, methansulfonate, trifluoromethanesulfonate, and p-toluenesulfonate, or a (meth)acryloyloxy group.

Examples of the compound having formula (7) include ethylene glycol, 1,3-propanediol, 1,4-butanediol, 1,5-pentanediol, 1,6-hexanediol, 1,8-octanediol, 1,10-decanediol, catechol, resorcinol, hydroquinone, polyethylene glycol, polypropylene glycol, 1,2-ethanedithiol, 1,3-propanedithiol, 1,4-butanedithiol, 1,5-pentanedithiol, 1,6-hexanedithiol, 1,8-octanedithiol, 1,10-decanedithiol, 1,2-benzenedithiol, 1,3-benzenedithiol, 1,4-benzenedithiol, ethylene bis(thioglycolate), ethylene glycol bis(3-mercaptopropionate), diethylene glycol bis(3-mercaptopropionate), triethylene glycol bis(3-mercaptopropionate), tetraethylene glycol bis(3-mercaptopropionate), polyethylene glycol bis(3-mercaptopropionate), polypropylene glycol bis(3-mercaptopropionate), 1,4-butanediol bis(thioglycolate), α,ω-bis(aminopropyl)polyethylene glycol ether, α,ω-bis(aminopropyl)polypropylene glycol ether, ethylenediamine, N,N'-dimethylethylenediamine, N,N'-di-t-butylethylenediamine, N,N'-diphenylethylenediamine, hexamethylenediamine, octamethylenediamine, nonamethylenediamine, o-phenylenediamine, m-phenylenediamine, p-phenylenediamine, o-xylylenediamine, m-xylylenediamine, p-xylylenediamine, α,ω-bis(aminopropyl)polyethylene glycol ether, α,ω-bis(aminopropyl)polypropylene glycol ether, etc. Among these, preferred from the aspects of reactivity, availability, productivity, and cost are ethylene glycol, polyethylene glycol, polypropylene glycol, ethylene glycol bis(3-mercaptopropionate), diethylene glycol bis(3-mercaptopropionate), triethylene glycol bis(3-mercaptopropionate), tetraethylene glycol bis(3-mercaptopropionate), polyethylene glycol bis(3-mercaptopropionate), polypropylene glycol bis(3-mercaptopropionate), N,N'-di-t-butylethylenediamine, N,N'-diphenylethylenediamine, α,ω-bis(aminopropyl)polyethylene glycol ether, and α,ω-bis(aminopropyl)polypropylene glycol ether. More preferred are polypropylene glycol, tetraethylene glycol bis(3-mercaptopropionate), polypropylene glycol bis(3-mercaptopropionate), and α,ω-bis(aminopropyl)polypropylene glycol ether.

In monoalkoxysilane II having formula (8), $R^7$ is a group containing a functional group capable of reacting with a hydroxyl, mercapto or amino group. As long as the group contains a functional group capable of reacting with a hydroxyl, mercapto or amino group, its structure is not particularly limited. Specifically, $R^7$ is a leaving group such as chlorine, bromine, iodine, methansulfonate, trifluoromethanesulfonate, or p-toluenesulfonate, or a (meth)acryloyloxy group, with chlorine and (meth)acryloyloxy being preferred.

Examples of monoalkoxysilane II having formula (8) include chloromethyldimethylmethoxysilane, chloromethyldimethylethoxysilane, acryloyloxymethyldimethylmethoxysilane, acryloyloxymethyldimethylethoxysilane, methacryloyloxymethyldimethylmethoxysilane, and methacryloyloxymethyldimethylethoxysilane.

Of these, chloromethyldimethylmethoxysilane, acryloyloxymethyldimethylmethoxysilane, and methacryloyloxymethyldimethylmethoxysilane are preferred from the aspect of hydrolysis, with chloromethyldimethylmethoxysilane and acryloyloxymethyldimethylmethoxysilane being more preferred.

The method for reacting the compound having formula (7) with monoalkoxysilane II having formula (8) is not particularly limited, and a choice may generally be made among well-known methods commonly used in the reactions with hydroxyl, mercapto or amino groups.

Specifically, when the organic functional group on monoalkoxysilane II contains a leaving group, i.e., is chlorine, bromine, iodine, methanesulfonate, trifluoromethanesulfonate or p-toluenesulfonate group, the nucleophilic substitution reaction (desalting reaction) of the leaving group with the compound having a hydroxyl, mercapto or amino group, represented by formula (7) may be performed according to the prior art well-known preparation methods. When the organic functional group on monoalkoxysilane II is a (meth)acryloyloxy group, the Michael addition reaction of the (meth)acryloyloxy group with the compound having a hydroxyl, mercapto or amino group, represented by formula (7) may be performed according to the prior art well-known preparation methods.

Although the reaction proportion of the compound having formula (7) and monoalkoxysilane II having formula (8) is not particularly limited, it is preferred from the aspects of reducing unreacted reactants and enhancing the shelf stability and other properties of the resulting organosilicon compound to adjust the reaction proportion such that that monoalkoxysilane II having formula (8) gives 0.1 to 2.0 moles, more preferably 0.4 to 1.5 moles, even more preferably 0.8 to 1.2 moles of organic functional groups $R^7$ per mole of the hydroxyl, mercapto or amino group on the compound having a hydroxyl, mercapto or amino group, represented by formula (7).

Although there is no need to use a basic compound during the nucleophilic substitution reaction in the case of monoalkoxysilane II having an organic functional group containing a leaving group, a basic compound may be used for accelerating the reaction rate.

Any of various basic compounds commonly used in nucleophilic substitution reaction may be used as long as it is reactive with nothing but active hydrogen on the compound having formula (7).

Examples include alkali metals such as metallic sodium and metallic lithium; alkaline earth metals such as metallic calcium; alkali metal hydrides such as sodium hydride, lithium hydride, potassium hydride and cesium hydride; alkaline earth metal hydrides such as calcium hydride; alkali and alkaline earth metal alkoxides such as sodium methoxide, sodium ethoxide, potassium tert-butoxide, and sodium tert-butoxide; alkali and alkaline earth metal carbonates such as potassium carbonate, sodium carbonate and calcium carbonate; alkali and alkaline earth metal hydrogencarbonates such as sodium hydrogencarbonate and potassium hydrogencarbonate; tertiary amines such as triethylamine, tributylamine, N,N-diisopropylethylamine, tetramethylethylenediamine, triethylenediamine, pyridine, and N,N-dimethyl-4-aminopyridine; and amidines such as diazabicycloundecene and diazabicyclononene.

Of these, preferred from the aspect of reaction efficiency are alkali metal hydrides such as sodium hydride, alkali and alkaline earth metal alkoxides such as sodium methoxide, sodium ethoxide, potassium tert-butoxide, tertiary amines such as triethylamine and tributylamine, and amidines such as diazabicycloundecene. Most preferred are sodium methoxide, potassium tert-butoxide, triethylamine and diazabicycloundecene.

Although the amount of the basic compound used is not particularly limited, it is preferred from the aspects of driving the nucleophilic substitution reaction fully forward to prevent some reactants from being left behind, preventing the basic compound from being left in excess, and enhancing the shelf stability and other properties of the resulting organosilicon compound to use 0.5 to 10 moles, more preferably 0.8 to 2 moles, even more preferably 0.9 to 1.2 moles of the basic compound per mole of leaving group on monoalkoxysilane II having formula (8).

In the nucleophilic substitution reaction, a solvent which is inert to the reactants may be used.

Examples include alcohol solvents such as methanol, ethanol, propanol, isopropanol and butanol; hydrocarbon solvents such as pentane, hexane, heptane, octane, decane, and cyclohexane; aromatic solvents such as benzene, toluene, and xylene; amide solvents such as formamide, N,N-dimethylformamide, pyrrolidone, and N-methylpyrrolidone; ether solvents such as diethyl ether, dibutyl ether, cyclopentyl methyl ether, tetrahydrofuran, and 1,4-dioxane, and nitrile solvents such as acetonitrile, which may be used alone or in admixture of two or more.

Of these, methanol, ethanol, toluene, xylene, dimethylformamide, cyclopentyl methyl ether, tetrahydrofuran and acetonitrile are preferred from the aspect of reaction efficiency.

The temperature during the nucleophilic substitution reaction is preferably 25 to 150° C., more preferably 40 to 120° C., even more preferably 60 to 100° C. from the aspects of providing an adequate reaction rate and suppressing volatilization of monoalkoxysilane II having formula (8), though not particularly limited.

Although the nucleophilic substitution reaction is typically performed under atmospheric pressure, the reaction may be performed under pressure for the purposes of suppressing volatilization of monoalkoxysilane II and accelerating the reaction rate.

The reaction time is typically 10 minutes to 100 hours, though not particularly limited.

It is noted that a catalyst may be used in the nucleophilic substitution reaction for accelerating the reaction rate.

Any suitable catalyst which is non-reactive with the reactants may be selected from various catalysts commonly used in nucleophilic substitution reaction.

Examples include crown ethers such as 12-crown-4, 15-crown-5, 18-crown-6, and dibenzo-18-crown-6; quaternary ammonium salts such as tetrabutylammonium chloride, tetrabutylammonium bromide, tetrabutylammonium iodide, and tetrabutylammonium hydrogensulfate; and alkali metal halides such as potassium iodide and sodium iodide, which may be used alone or in admixture of two or more.

Of these, preferred from the aspects of reactivity and availability are 18-crown-6, tetrabutylammonium bromide, tetrabutylammonium iodide, tetrabutylammonium hydrogensulfate, and potassium iodide. Inter alia, tetrabutylammonium iodide, tetrabutylammonium hydrogensulfate, and potassium iodide are more preferred, with tetrabutylammonium hydrogensulfate being most preferred.

The catalyst acts as a phase transfer catalyst or activates the leaving group to accelerate the reaction rate.

The catalyst may be used in a catalytic amount, preferably in an amount of 0.001 to 10% by weight, more preferably 0.01 to 1% by weight based on the total of the compound having formula (7) and monoalkoxysilane II having formula (8).

Although there is no need to use a catalyst during the Michael addition reaction in the case of monoalkoxysilane II having an organic functional group containing a (meth) acryloyloxy group, a catalyst may be used for accelerating the reaction rate.

Although the catalyst used herein is not particularly limited, a choice may be made among those commonly used in radical addition reaction. Preferred are radical polymerization initiators capable of generating radicals in response to heat or light or through redox reaction.

Examples of the radical polymerization initiator include aqueous hydrogen peroxide, organic peroxides such as t-butyl hydroperoxide, di-t-butyl peroxide, (2-ethylhexanoyl)(t-butyl)peroxide, benzoyl peroxide, cumene hydroperoxide, and dicumyl peroxide; azo compounds such as 2,2'-azobispropane, 2,2'-azobisisobutane, 2,2'-azobisisobutyronitrile, 2,2'-azobis-2-methylbutyronitrile, 2,2'-azobis-2-methylvaleronitrile, 2,2'-azobis-2,4-dimethylvaleronitrile, methyl 2,2'-azobis-2-methylpropionate, 2,2'-dichloro-2,2'-azobispropane, 2,2'-dichloro-2,2'-azobisbutane, 1,1'-azo(methylethyl) diacetate, 2,2'-azobisisobutylamide, dimethyl 2,2'-azobisisobutyrate, 3,5-dihydroxymethylphenylazo-2-methylmalonodinitrile, and dimethyl 4,4'-azobis-4-cyanovalerate; redox initiators such as hydrogen peroxide-iron(II) salt, cerium(IV) salt-alcohol, and organic peroxide-dimethylaniline; photopolymerization initiators such as 2-benzyl-2-dimethylamino-1-(4-morpholinophenyl)-1-butanone, 2-methyl-1-[4-(methylthio)phenyl]-2-morpholinopropan-1-one, 2-dimethylamino-2-(4-methylbenzyl)-1-(4-morpholin-4-ylphenyl)butan-1-one, 1-hydroxycyclohexyl phenyl ketone, 2-hydroxy-2-methyl-1-phenylpropan-1-one, 2,2-dimethoxy-1,2-diphenylethan-1-one, 1-[4-(2-hydroxyethoxy)-phenyl]-2-hydroxy-2-methyl-1-propan-1-one, 2-hydroxy-1-[4-{4-(2-hydroxy-2-methylpropionyl)benzyl}phenyl]-2-methylpropan-1-one, 2,4,6-trimethylbenzoyldiphenylphosphine oxide, bis(2,4,6-trimethylbenzoyl)phenylphosphine oxide, bis(2,6-dimethoxybenzoyl)-2,4,4-trimethylpentylphosphine oxide; and dialkyl disulfides such as tetraalkylthiuram disulfides, which may be used alone or in admixture of two or more.

Of these, (2-ethylhexanoyl)(t-butyl)peroxide and 2,2'-azobis-2-methylbutyronitrile are preferred from the aspect of the reaction rate of Michael addition reaction, with 2,2'-azobis-2-methylbutyronitrile being most preferred.

The catalyst may be used in a catalytic amount, typically in an amount of 0.001 to 10% by weight based on the total of the compound having formula (7) and monoalkoxysilane II having formula (8).

Although the Michael addition reaction takes place in a solventless system, a solvent having no detrimental impact on the reaction may be used.

Examples include hydrocarbon solvents such as pentane, hexane, heptane, octane, decane and cyclohexane; aromatic solvents such as benzene, toluene and xylene; amide solvents such as formamide, N,N-dimethylformamide, pyrrolidone, and N-methylpyrrolidone; ester solvents such as ethyl acetate, butyl acetate, γ-butyrolactone, and propylene glycol 1-monomethyl ether 2-acetate; and nitrile solvents such as acetonitrile, which may be used alone or in admixture of two or more.

The temperature during the Michael addition reaction is preferably 0 to 150° C., more preferably 0 to 100° C. from the aspects of providing an adequate reaction rate and controlling side reactions, though not particularly limited.

The reaction time is typically 10 minutes to 24 hours, though not particularly limited.

The organosilicon compound having formula (3) may be prepared by reacting an amino-containing compound having the structural formula (9) with monoalkoxysilane II having formula (8).

[Chem. 25]

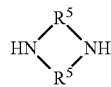

(9)

Herein $R^5$ is as defined above.

Preferred examples of the compound having formula (9) include diazetidine, piperazine, and diazocine. Piperazine is most preferred from the aspects of reactivity, availability, productivity, and cost.

The method for reacting the compound having formula (9) with monoalkoxysilane II having formula (8) is not particularly limited, and a choice may be generally made among well-known methods used in the reaction with the compound having formula (9).

Specifically, suitable methods are as exemplified above for the reaction of the compound having formula (7) with monoalkoxysilane II having formula (8).

Meanwhile, the organosilicon compound having formula (4) may be prepared by reacting a compound having the structural formula (10) with monoalkoxysilane II having formula (8).

[Chem. 26]

$$M\text{-}X^2\text{-}M \qquad (10)$$

Herein $X^2$ is as defined above. M is hydrogen or an alkali metal.

Examples of the compound having formula (10) include methylamine, ethylamine, propylamine, isopropylamine, butylamine, isobutylamine, tert-butylamine, hexylamine, octylamine, decylamine, aniline, 1-naphthylamine, 2-naphthylamine, sodium sulfide, potassium sulfide and hydrogen sulfide. Of these, butylamine, octylamine, aniline and sodium sulfide are preferred from the aspects of reactivity, availability, productivity, and cost, with butylamine, aniline and sodium sulfide being more preferred.

The method for reacting the compound having formula (10) with monoalkoxysilane II having formula (8) is not particularly limited, and a choice may be generally made among well-known methods used in the reaction with the compound having formula (10).

Specifically, suitable methods are as exemplified above for the reaction of the compound having formula (7) with monoalkoxysilane II having formula (8).

The invention further provides a curable composition, coating composition, and adhesive composition (collectively referred to as composition, hereinafter) comprising (A) the organosilicon compound defined above and (B) a curing catalyst.

The organosilicon compound as component (A) has a specific structure, which ensures that when a cured article is obtained through coating or bonding treatment with a composition comprising the organosilicon compound, the organosilicon compound provides a cured product with better curability and flexibility than prior art compositions.

The curing catalyst (B) used in the composition is a component for promoting hydrolytic condensation reaction of hydrolyzable groups on the organosilicon compound (A) with airborne moisture or dealcoholization reaction of the organosilicon compound with silanol groups, and helping the composition cure, and added for efficient curing.

The curing catalyst is not particularly limited as long as it is used in the curing of conventional moisture condensation curable compositions. Examples include alkyl tin compounds such as dibutyltin oxide and dioctyltin oxide; alkyl tin ester compounds such as dibutyltin diacetate, dibutyltin dilaurate, dioctyltin dilaurate, dibutyltin dioctoate, dioctyltin dioctoate, and dioctyltin diversatate; titanates, titanium chelate compounds and partial hydrolyzates thereof such as tetraisopropoxytitanium, tetra-n-butoxytitanium, tetrakis(2-ethylhexoxy)titanium, dipropoxybis(acetylacetonato)titanium, titanium diisopropoxybis(ethylacetoacetate), and titanium isopropoxyoctylene glycol; organometallic compounds such as zinc naphthenate, zinc stearate, zinc 2-ethyloctoate, iron 2-ethylhexoate, cobalt 2-ethylhexoate, manganese 2-ethylhexoate, cobalt naphthenate, aluminum trihydroxide, aluminum alcoholate, aluminum acylate, aluminum acylate salts, aluminosiloxy compounds, and aluminum chelates; aminoalkyl-substituted alkoxysilanes such as 3-aminopropyltrimethoxysilane, 3-aminopropyltriethoxysilane, 3-aminopropylmethyldimethoxysilane, 3-aminopropylmethyldiethoxysilane, N-β-(aminoethyl)-γ-aminopropyltrimethoxysilane, N-β-(aminoethyl)-γ-aminopropyltriethoxysilane, N-β-(aminoethyl)-γ-aminopropylmethyldimethoxysilane, N-β-(aminoethyl)-γ-aminopropylmethyldiethoxysilane, bis[3-(trimethoxysilyl) propyl]amine, bis[3-(triethoxysilyl)propyl]amine, N,N'-bis [3-(trimethoxysilyl)propyl]ethane-1,2-diamine, N,N'-bis[3-(triethoxysilyl)propyl]ethane-1,2-diamine, and N-phenyl-3-aminopropyltrimethoxysilane; amine compounds and salts thereof such as hexylamine, dodecylamine phosphate and tetramethylguanidine; quaternary ammonium salts such as benzyltriethylammonium acetate; alkali metal salts of lower fatty acids such as potassium acetate, sodium acetate, and lithium oxalate; dialkylhydroxylamines such as dimethylhydroxylamine and diethylhydroxylamine; silanes and siloxanes having a guanidyl group such as tetramethylguanidylpropyltrimethoxysilane, tetramethylguanidylpropylmethyldimethoxysilane, tetramethylguanidylpropyltriethoxysilane, tetramethylguanidylpropylmethyldiethoxysilane, and tetramethylguanidylpropyltris(trimethylsiloxy)silane; and phosphazene base-containing silanes and siloxanes such as N,N,N',N',N'',N''-hexamethyl-N'''-[3-(trimethoxysilyl) propyl]-phosphorimidic triamide, which may be used alone or in admixture.

Of these, preference is given to dioctyltin dilaurate, dioctyltin diversatate, tetraisopropoxytitanium, tetra-n-butoxytitanium, titanium diisopropoxybis(ethylacetoacetate), 3-aminopropyltrimethoxysilane, N-β-(aminoethyl)-γ-aminopropyltrimethoxysilane, bis[3-(trimethoxysilyl)propyl] amine, N,N'-bis[3-(trimethoxysilyl)propyl]ethane-1,2-diamine, and tetramethylguanidylpropyltrimethoxysilane because of more reactivity. From the standpoint of effective cure of the composition, more preference is given to dioctyltin dilaurate, dioctyltin diversatate, 3-aminopropyltrimethoxysilane, and tetramethylguanidylpropyltrimethoxysilane. From the standpoint that the composition is free of organotin compounds and less toxic, 3-aminopropyltrimethoxysilane and tetramethylguanidylpropyltrimethoxysilane are especially preferred. From the standpoint of effective cure of the composition, tetramethylguanidylpropyltrimethoxysilane is most preferred.

Although the amount of the curing catalyst (B) added is not particularly limited, the amount is preferably 0.01 to 15 parts by weight, more preferably 0.1 to 5 parts by weight per 100 parts by weight of component (A) because it is desirable to adjust the curing rate to an appropriate range for efficient working.

The inventive composition may further comprise a solvent. The solvent used herein is not particularly limited as long as component (A) is dissolvable therein. Examples of the solvent include hydrocarbon solvents such as pentane, hexane, heptane, octane, decane, and cyclohexane; aromatic solvents such as benzene, toluene, and xylene; amide solvents such as formamide, N,N-dimethylformamide, pyrrolidone, and N-methylpyrrolidone; ester solvents such as ethyl acetate, butyl acetate, γ-butyrolactone, and propylene glycol-1-monomethyl ether-2-acetate; ketone solvents such as acetone, methyl ethyl ketone, and methyl isobutyl ketone; and ether solvents such as diethyl ether, dibutyl ether, cyclopentyl methyl ether, tetrahydrofuran, and 1,4-dioxane, which may be used alone or in admixture.

Of these, aromatic solvents such as toluene and xylene are preferred from the standpoints of solubility and volatility.

The amount of the solvent added is preferably 10 to 20,000 parts by weight, more preferably 100 to 10,000 parts by weight per 100 parts by weight of component (A).

It is noted that various bases and additives such as base polymers, adhesion improvers, inorganic and organic UV absorbers, storage stability improvers, plasticizers, fillers, pigments and flavors may be added to the inventive composition depending on a particular application.

A coated solid substrate may be obtained by coating the coating composition of the invention described above on the surface of a solid substrate and curing the composition to form a coating layer. Also, a bonded laminate may be obtained by coating the adhesive composition of the invention on the surface of a solid substrate, laying another solid substrate thereon, and curing the composition to form a bond layer.

The technique of coating each composition is not particularly limited. The coating technique may be selected as appropriate from well-known techniques such as spray coating, spin coating, dip coating, roller coating, brush coating, bar coating, and flow coating.

The solid substrate is not particularly limited. Examples include organic resin substrates such as epoxy resins, phenolic resins, polyimide resins, polycarbonate resins such as polycarbonates and polycarbonate blends, acrylic resins such as poly(methyl methacrylate), polyester resins such as poly(ethylene terephthalate), poly(butylene terephthalate), and unsaturated polyester resins, polyamide resins, acrylonitrile-styrene copolymer resins, styrene-acrylonitrile-butadiene copolymer resins, polyvinyl chloride resins, polystyrene resins, blends of polystyrene and polyphenylene ether, cellulose acetate butyrate, and polyethylene resins; metal substrates such as iron, copper and steel plates; paint-coated surfaces; glass; ceramics; concrete; slates; textiles; inorganic fillers such as wood, stone, tiles, (hollow) silica, titania, zirconia, and alumina; and fiber glass parts such as glass fibers, glass clothes, glass tape, glass mat, and glass paper. The material and shape of the substrate are not particularly limited.

The inventive composition is such that upon contact with moisture in the atmosphere, hydrolytic condensation reaction of the organosilicon compound (A) or dealcoholization reaction of the organosilicon compound (A) with silanol groups takes place. As the index of moisture in the atmosphere, any humidity in the range of RH 10% to 100% is acceptable. Since faster hydrolysis takes place at a higher humidity, moisture may be added to the atmosphere if desired.

The temperature and time of curing reaction may vary over a range depending on various factors such as a particular substrate, moisture concentration, catalyst concentration, and the type of hydrolyzable group. The curing reaction temperature is preferably normal temperature around 25° C. from the standpoint of working. To promote curing reaction, the coating may be cured by heating within the range below which the substrate is heat resistant. The curing reaction time is typically about 1 minute to about 1 week from the standpoint of working efficiency.

The inventive composition cures effectively even at normal temperature. Particularly when room temperature cure is essential for in-situ application or the like, the composition is good in cure and working because the coating surface becomes tack-free within several minutes to several hours. Nevertheless, heat treatment within the range below which the substrate is heat resistant is acceptable.

EXAMPLES

Examples and Comparative Examples are given below for further illustrating the invention although the invention is not limited thereto.

It is noted that the viscosity is measured at 25° C. by a Brookfield rotational viscometer.

[1] Synthesis of Organosilicon Compounds

[Example 1-1] Synthesis of Organosilicon Compound 1

[Chem. 27]

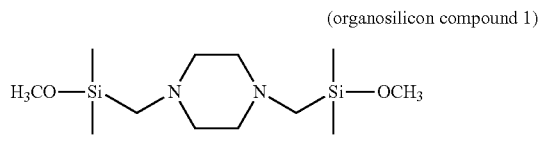

(organosilicon compound 1)

A 200-mL separable flask equipped with a stirrer, reflux condenser, dropping funnel and thermometer was charged with 15.5 g (0.18 mol) of piperazine, 25 g of acetonitrile, and 54.8 g (0.36 mol) of diazabicycloundecene and heated at 80° C. Then, 50.0 g (0.36 mol) of chloromethyldimethylmethoxysilane was added dropwise to the contents, which were stirred at 80° C. for 5 hours. On GC analysis, the time when the reactant, chloromethyldimethylmethoxysilane disappeared completely was regarded the end of reaction. Subsequent purification by distillation yielded organosilicon compound 1 of the above structure.

[Example 1-2] Synthesis of Organosilicon Compound 2

[Chem. 28]

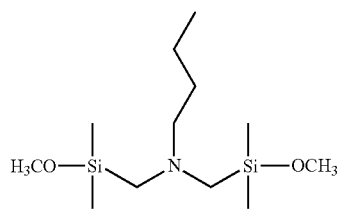

(organosilicon compound 2)

A 200-mL separable flask equipped with a stirrer, reflux condenser, dropping funnel and thermometer was charged with 13.2 g (0.18 mol) of butylamine, 25 g of acetonitrile, and 54.8 g (0.36 mol) of diazabicycloundecene and heated at 80° C. Then, 50.0 g (0.36 mol) of chloromethyldimethylmethoxysilane was added dropwise to the contents, which were stirred at 80° C. for 5 hours. On GC analysis, the time when the reactant, chloromethyldimethylmethoxysilane disappeared completely was regarded the end of reaction. Subsequent purification by distillation yielded organosilicon compound 2 of the above structure.

[Example 1-3] Synthesis of Organosilicon Compound 3

[Chem. 29]

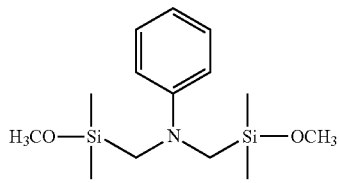

(organosilicon compound 3)

A 200-mL separable flask equipped with a stirrer, reflux condenser, dropping funnel and thermometer was charged with 16.8 g (0.18 mol) of aniline, 25 g of acetonitrile, and 54.8 g (0.36 mol) of diazabicycloundecene and heated at 80° C. Then, 50.0 g (0.36 mol) of chloromethyldimethylmethoxysilane was added dropwise to the contents, which were stirred at 80° C. for 5 hours. On GC analysis, the time when the reactant, chloromethyldimethylmethoxysilane disappeared completely was regarded the end of reaction. Subsequent purification by distillation yielded organosilicon compound 3 of the above structure.

[Example 1-4] Synthesis of Organosilicon Compound 4

[Chem. 30]

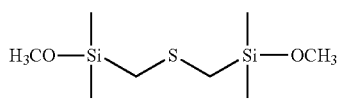

(organosilicon compound 4)

A 200-mL separable flask equipped with a stirrer, reflux condenser, dropping funnel and thermometer was charged with 14.1 g (0.18 mol) of sodium sulfide and 50 g of methanol and heated at 60° C. Then, 50.0 g (0.36 mol) of chloromethyldimethylmethoxysilane was added dropwise to the contents, which were stirred at 80° C. for 5 hours. On GC analysis, the time when the reactant, chloromethyldimethylmethoxysilane disappeared completely was regarded the end of reaction. Subsequent purification by distillation yielded organosilicon compound 4 of the above structure.

[Example 1-5] Synthesis of Organosilicon Compound 5

[Chem. 31]

(organosilicon compound 5)

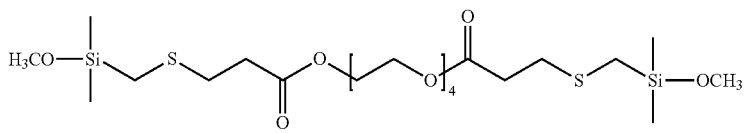

A 200-mL separable flask equipped with a stirrer, reflux condenser, dropping funnel and thermometer was charged with 66.7 g (0.18 mol) of tetraethylene glycol bis(3-mercaptopropionate) and 40.4 g (0.36 mol) of potassium tert-butoxide and heated at 80° C. Then, 50.0 g (0.36 mol) of chloromethyldimethylmethoxysilane was added dropwise to the contents, which were stirred at 80° C. for 5 hours. On GC analysis, the time when the reactant, chloromethyldimethylmethoxysilane disappeared completely was regarded the end of reaction. Subsequently, the salt formed with the progress of reaction and the excess of basic compound were removed by pressure filtration, yielding organosilicon compound 5 of the above structure.

[Example 1-6] Synthesis of Organosilicon Compound 6

[Chem. 32]

(organosilicon compound 6)

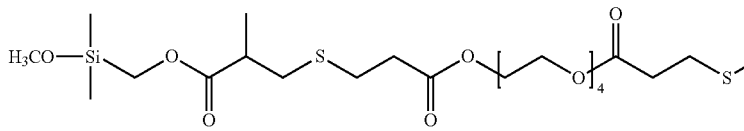

A 200-mL separable flask equipped with a stirrer, reflux condenser, dropping funnel and thermometer was charged with 66.7 g (0.18 mol) of tetraethylene glycol bis(3-mercaptopropionate) and 0.1 g of 2,2'-azobis-2-methylbutyronitrile and heated at 80° C. Then, 67.8 g (0.36 mol) of methacryloyloxymethyldimethylmethoxysilane was added dropwise to the contents, which were stirred at 80° C. for 5 hours. On GC analysis, the time when the reactant, methacryloyloxymethyldimethylmethoxysilane disappeared completely was regarded the end of reaction. There was obtained organosilicon compound 6 of the above structure.

[Example 1-7] Synthesis of Organosilicon Compound 7

A 200-mL separable flask equipped with a stirrer, reflux condenser, dropping funnel and thermometer was charged with 15.5 g (0.18 mol) of piperazine and 60 g of methanol and heated at 60° C. Then, 62.7 g (0.36 mol) of acryloyloxymethyldimethylmethoxysilane was added dropwise to the contents, which were stirred at 60° C. for 5 hours. On GC analysis, the time when the reactant, acryloyloxymethyldimethylmethoxysilane disappeared completely was regarded the end of reaction. There was obtained organosilicon compound 7 of the above structure.

[Example 1-8] Synthesis of Organosilicon Compound 8

[Chem. 33]

(organosilicon compound 7)

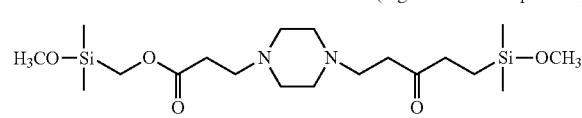

[Chem. 34]

(organosilicon compound 8)

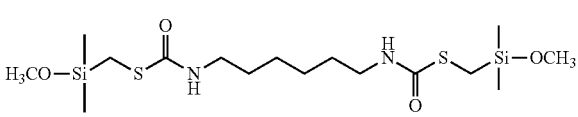

A 200-mL separable flask equipped with a stirrer, reflux condenser, dropping funnel and thermometer was charged with 30.3 g (0.18 mol) of hexamethylene diisocyanate and 0.1 g of dioctyltin dilaurate and heated at 90° C. Then, 49.1 g (0.36 mol) of mercaptomethyldimethylmethoxysilane was added dropwise to the contents, which were stirred at 90° C. for 2 hours. On GC analysis, the time when the reactant, mercaptomethyldimethylmethoxysilane disappeared completely was regarded the end of reaction. There was obtained organosilicon compound 8 of the above structure.

[Example 1-9] Synthesis of Organosilicon Compound 9

[Chem. 35]

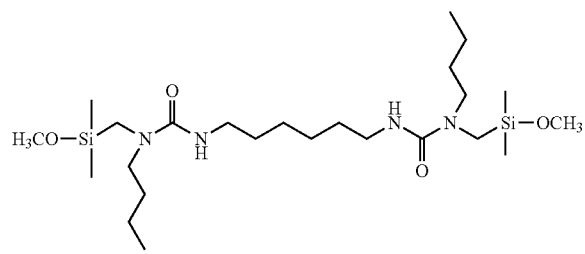

(organosilicon compound 9)

A 200-mL separable flask equipped with a stirrer, reflux condenser, dropping funnel and thermometer was charged with 30.3 g (0.18 mol) of hexamethylene diisocyanate and heated at 90° C. Then, 63.1 g (0.36 mol) of N-butylaminomethyldimethylmethoxysilane was added dropwise to the contents, which were stirred at 90° C. for 2 hours. On GC analysis, the time when the reactant, N-butylaminomethyldimethylmethoxysilane disappeared completely was regarded the end of reaction. There was obtained organosilicon compound 9 of the above structure.

[Example 1-10] Synthesis of Organosilicon Compound 10

[Chem. 36]

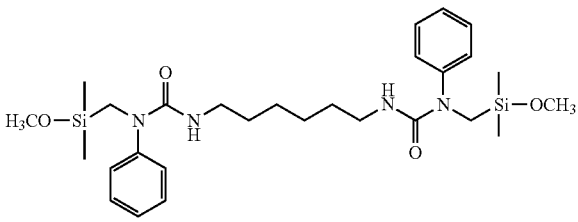

(organosilicon compound 10)

A 200-mL separable flask equipped with a stirrer, reflux condenser, dropping funnel and thermometer was charged with 30.3 g (0.18 mol) of hexamethylene diisocyanate and heated at 90° C. Then, 70.3 g (0.36 mol) of N-phenylaminomethyldimethylmethoxysilane was added dropwise to the contents, which were stirred at 90° C. for 2 hours. On GC analysis, the time when the reactant, N-phenylaminomethyldimethylmethoxysilane disappeared completely was regarded the end of reaction. There was obtained organosilicon compound 10 of the above structure.

[Example 1-11] Synthesis of Organosilicon Compound 11

[Chem. 37]

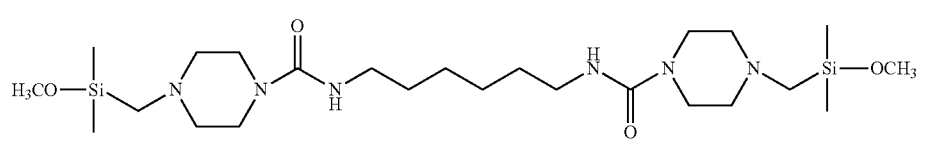

(organosilicon compound 11)

A 200-mL separable flask equipped with a stirrer, reflux condenser, dropping funnel and thermometer was charged with 30.3 g (0.18 mol) of hexamethylene diisocyanate and heated at 90° C. Then, 67.8 g (0.36 mol) of N-(dimethylmethoxysilylmethyl)piperazine was added dropwise to the contents, which were stirred at 90° C. for 2 hours. On GC analysis, the time when the reactant, N-(dimethylmethoxysilylmethyl)piperazine disappeared completely was regarded the end of reaction. There was obtained organosilicon compound 11 of the above structure.

[Example 1-12] Synthesis of Organosilicon Compound 12

[Chem. 38]

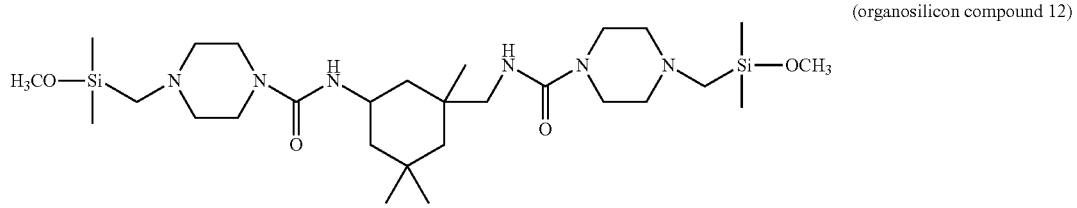

(organosilicon compound 12)

A 200-mL separable flask equipped with a stirrer, reflux condenser, dropping funnel and thermometer was charged with 40.0 g (0.18 mol) of isophorone diisocyanate and heated at 90° C. Then, 67.8 g (0.36 mol) of N-(dimethylmethoxysilylmethyl)piperazine was added dropwise to the contents, which were stirred at 90° C. for 2 hours. On GC analysis, the time when the reactant, N-(dimethylmethoxysilylmethyl)piperazine disappeared completely was regarded the end of reaction. There was obtained organosilicon compound 12 of the above structure.

[Example 1-13] Synthesis of Organosilicon Compound 13

[Chem. 39]

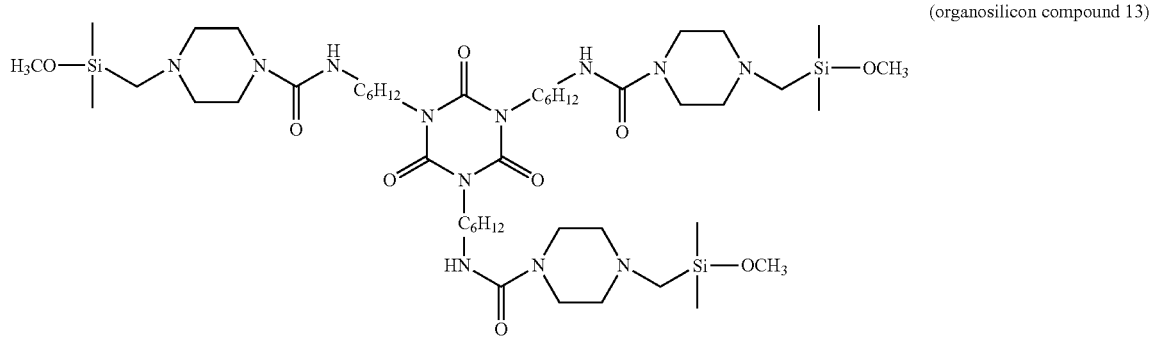

(organosilicon compound 13)

A 300-mL separable flask equipped with a stirrer, reflux condenser, dropping funnel and thermometer was charged with 90.8 g (0.18 mol) of tris(6-isocyanatohexyl)isocyanurate and heated at 90° C. Then, 101.7 g (0.54 mol) of N-(dimethylmethoxysilylmethyl)piperazine was added dropwise to the contents, which were stirred at 90° C. for 2 hours. On GC analysis, the time when the reactant, N-(dimethylmethoxysilylmethyl)piperazine disappeared completely was regarded the end of reaction. There was obtained organosilicon compound 13 of the above structure.

[Example 1-14] Synthesis of Organosilicon Compound 14

[Chem. 40]

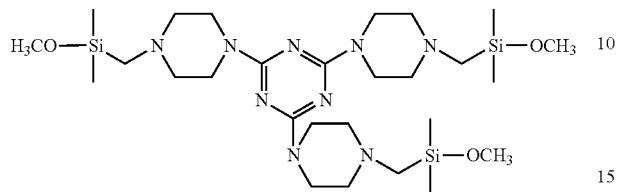

(organosilicon compound 14)

A 300-mL separable flask equipped with a stirrer, reflux condenser, dropping funnel and thermometer was charged with 33.2 g (0.18 mol) of isocyanuric chloride, 40 g of acetonitrile, and 82.2 g (0.54 mol) of diazabicycloundecene and heated at 80° C. Then, 101.7 g (0.54 mol) of N-(dimethylmethoxysilylmethyl)piperazine was added dropwise to the contents, which were stirred at 80° C. for 5 hours. On GC analysis, the time when the reactant, N-(dimethylmethoxysilylmethyl)piperazine disappeared completely was regarded the end of reaction. Since the solution after the reaction separated into two layers, the layer containing the basic compound and the salt formed with the progress of reaction was removed from the target compound layer by separatory operation. Thereafter, the target compound layer was heated at 100° C., at which acetonitrile was distilled off under a reduced pressure below 10 mmHg, yielding organosilicon compound 14 of the above structure.

[Example 1-15] Synthesis of Organosilicon Compound 15

[Chem. 41]

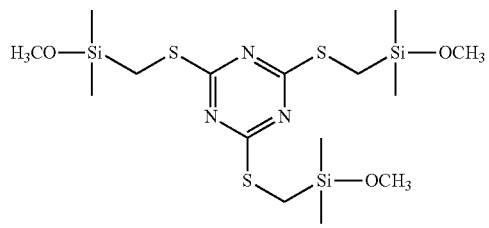

(organosilicon compound 15)

A 300-mL separable flask equipped with a stirrer, reflux condenser, dropping funnel and thermometer was charged with 33.2 g (0.18 mol) of isocyanuric chloride, 40 g of acetonitrile, and 82.2 g (0.54 mol) of diazabicycloundecene and heated at 80° C. Then, 73.7 g (0.54 mol) of mercaptomethyldimethylmethoxysilane was added dropwise to the contents, which were stirred at 80° C. for 5 hours. On GC analysis, the time when the reactant, mercaptomethyldimethylmethoxysilane disappeared completely was regarded the end of reaction. Since the solution after the reaction separated into two layers, the layer containing the basic compound and the salt formed with the progress of reaction was removed from the target compound layer by separatory operation. Thereafter, the target compound layer was heated at 100° C., at which acetonitrile was distilled off under a reduced pressure below 10 mmHg, yielding organosilicon compound 15 of the above structure.

[Comparative Example 1-1] Synthesis of Organosilicon Compound 16

[Chem. 42]

(organosilicon compound 16)

A 200-mL separable flask equipped with a stirrer, reflux condenser, dropping funnel and thermometer was charged with 15.5 g (0.18 mol) of piperazine, 25 g of acetonitrile, and 54.8 g (0.36 mol) of diazabicycloundecene and heated at 80° C. Then, 60.0 g (0.36 mol) of chloropropyldimethylmethoxysilane was added dropwise to the contents, which were stirred at 80° C. for 5 hours. On GC analysis, the time when the reactant, chloropropyldimethylmethoxysilane disappeared completely was regarded the end of reaction. Subsequent purification by distillation yielded organosilicon compound 16 of the above structure.

[Comparative Example 1-2] Synthesis of Organosilicon Compound 17

[Chem. 43]

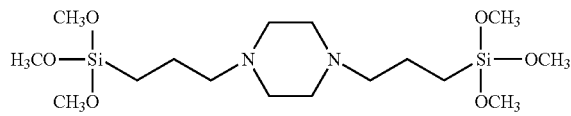

(organosilicon compound 17)

A 200-mL separable flask equipped with a stirrer, reflux condenser, dropping funnel and thermometer was charged with 15.5 g (0.18 mol) of piperazine, 25 g of acetonitrile, and 54.8 g (0.36 mol) of diazabicycloundecene and heated at 80° C. Then, 71.5 g (0.36 mol) of chloropropyltrimethoxysilane was added dropwise to the contents, which were stirred at 80° C. for 5 hours. On GC analysis, the time when the reactant, chloropropyltrimethoxysilane disappeared completely was regarded the end of reaction. Subsequent purification by distillation yielded organosilicon compound 17 of the above structure.

[2] Confirmation of Reactivity of Alkoxysilyl Group

Example 2-1

A composition was prepared on a moisture-blocked agitator by mixing 100 parts by weight of α,ω-dihydroxydimethylpolysiloxane having a viscosity of 5,000 mPa·s, 1 part by weight of organosilicon compound 1 obtained in Example 1-1, and 0.5 part by weight of tetramethylguanidylpropyltrimethoxysilane as curing catalyst until uniform.

Examples 2-2 to 2-15 and Comparative Examples 2-1 to 2-2

Compositions were prepared as in Example 2-1 aside from using organosilicon compounds 2 to 15 obtained in Examples 1-2 to 1-15 or organosilicon compounds 16 to 17 obtained in Comparative Examples 1-1 to 1-2 instead of organosilicon compound 1 in Example 2-1.

Comparative Example 2-3

A composition was prepared as in Example 2-1 aside from omitting organosilicon compound 1 obtained in Example 2-1.

The compositions prepared in Examples 2-1 to 2-15 and Comparative Examples 2-1 to 2-3 were evaluated as follows, with the results shown in Tables 1 and 2.

[Viscosity Rise]

A nitrogen gas-purged glass vial was charged with the composition obtained from the above preparation method, which was stored in plugged state in air at 25° C. and 50% RH. After a lapse of a predetermined time, a percent viscosity rise was computed as [(viscosity after the predetermined time)/(viscosity immediately after charging)]×100. A larger value indicates that alkoxysilyl groups are more reactive.

The composition was applied to a cold-finished steel plate by bar coater No. 5 in air at 25° C. and 50% RH and dried and cured in air at 25° C. and 50% RH for 7 days, obtaining a cured film.

Examples 3-2 to 3-15 and Comparative Examples 3-1 to 3-2

Compositions and cured films were prepared as in Example 3-1 aside from using organosilicon compounds 2 to 15 obtained in Examples 1-2 to 1-15 or organosilicon compounds 16 to 17 obtained in Comparative Examples 1-1 to 1-2 instead of organosilicon compound 1 in Example 3-1.

Comparative Example 3-3

A composition and cured film were prepared as in Example 3-1 aside from omitting organosilicon compound 1 in Example 3-1.

The cured films obtained in Examples 3-1 to 3-15 and Comparative Examples 3-1 to 3-3 were evaluated as follows, with the results shown in Tables 3 and 4.

TABLE 1

| | | Example | | | | | | | | |
|---|---|---|---|---|---|---|---|---|---|---|
| | | 2-1 | 2-2 | 2-3 | 2-4 | 2-5 | 2-6 | 2-7 | 2-8 | 2-9 |
| Organosilicon compound | | 1 | 2 | 3 | 4 | 5 | 6 | 7 | 8 | 9 |
| Viscosity rise, % | After 24 hr | 1050 | 940 | 820 | 750 | 600 | 580 | 690 | 680 | 850 |
| | After 100 hr | 2610 | 2580 | 2440 | 2410 | 2220 | 2200 | 2330 | 2290 | 2510 |

TABLE 2

| | | Example | | | | | | Comparative Example | | |
|---|---|---|---|---|---|---|---|---|---|---|
| | | 2-10 | 2-11 | 2-12 | 2-13 | 2-14 | 2-15 | 2-1 | 2-2 | 2-3 |
| Organosilicon compound | | 10 | 11 | 12 | 13 | 14 | 15 | 16 | 17 | — |
| Viscosity rise, % | After 24 hr | 750 | 930 | 900 | 1500 | 1370 | 950 | 100 | gelled | 100 |
| | After 100 hr | 2400 | 2450 | 2420 | 2520 | 2490 | 2440 | 102 | | 107 |

As seen from Tables 1 and 2, the compositions prepared in Examples 2-1 to 2-15 using organosilicon compounds 1 to 15 obtained in Examples 1-1 to 1-15 show higher viscosity rises than the compositions prepared in Comparative Examples 2-1 and 2-3, indicating alkoxysilyl groups having better reactivity.

In contrast, the compositions of Comparative Examples 2-1 and 2-3 show little viscosity rises, indicating a failure to provide sufficient reactivity. The composition of Comparative Example 2-2 gelled after a lapse of the predetermined time because of an excessive increase of crosslinking density. All these compositions are unsuitable for the purpose of the invention.

[3] Preparation of Composition and Cured Film

Example 3-1

A composition was prepared by mixing 80 parts by weight of silicone based coating agent KR-400 (Shin-Etsu Chemical Co., Ltd.) and 20 parts by weight of organosilicon compound 1 obtained in Example 1-1 on a moisture-blocked agitator until uniform.

[Flexibility]

A test piece in the form of a cold-finished steel plate having a cured film formed thereon by the above coating method was tested by using a mandrel flexing tester prescribed in JIS K5600-5-1, and bending the test piece on a cylindrical mandrel having a diameter of 8 mm. It was visually observed whether or not the cured film cracked (or crazed) and peeled at the surface as a result of flexural deformation. The test piece was evaluated good (○), that is, the cured film was fully flexible, when neither cracking nor peeling was observed, and poor (X) when cracking and/or peeling was observed.

TABLE 3

| | Example | | | | | | | | |
|---|---|---|---|---|---|---|---|---|---|
| | 3-1 | 3-2 | 3-3 | 3-4 | 3-5 | 3-6 | 3-7 | 3-8 | 3-9 |
| Organosilicon compound | 1 | 2 | 3 | 4 | 5 | 6 | 7 | 8 | 9 |
| Flexibility | ○ | ○ | ○ | ○ | ○ | ○ | ○ | ○ | ○ |

TABLE 4

| | Example | | | | | | Comparative Example | |
|---|---|---|---|---|---|---|---|---|
| | 3-10 | 3-11 | 3-12 | 3-13 | 3-14 | 3-15 | 3-1 | 3-23-3 |
| Organosilicon compound | 10 | 11 | 12 | 13 | 14 | 15 | 16 | 17 — |
| Flexibility | ○ | ○ | ○ | ○ | ○ | ○ | uncured | X X |

As seen from Tables 3 and 4, the compositions prepared in Examples 3-1 to 3-15 using organosilicon compounds 1 to 15 obtained in Examples 1-1 to 1-15 are more curable than the composition prepared in Comparative Example 3-1, indicating alkoxysilyl groups having better reactivity. Also the compositions using the inventive organosilicon compounds show higher flexibility than the compositions prepared in Comparative Examples 3-2 and 3-3.

In contrast, the composition prepared in Comparative Example 3-1 forms a coating which remains tacky or sticky even after a lapse of a predetermined time, indicating a failure to provide sufficient reactivity. The compositions of Comparative Examples 3-2 and 3-3 failed to keep the cured film flexible because of an excessive increase of crosslinking density.

It has been demonstrated that the inventive organosilicon compounds contain monoalkoxysilyl groups and yet have high reactivity, and cured films having improved flexibility are obtained therefrom.

Due to such properties, the inventive organosilicon compounds are advantageously used in the applications of coating agents, adhesives, and sealants.

The invention claimed is:

1. An organosilicon compound having the structural formula (3):

[Chem. 3]

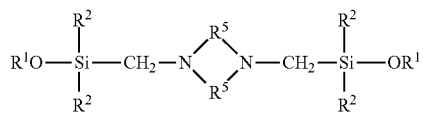

(3)

wherein
R$^1$ is a substituted or unsubstituted C$_1$-C$_{10}$ alkyl group, or a substituted or unsubstituted C$_6$-C$_{10}$ aryl group,
R$^2$ is each independently a substituted or unsubstituted C$_1$-C$_{10}$ alkyl group, or a substituted or unsubstituted C$_6$-C$_{10}$ aryl group, and
R$^5$ is an unsubstituted C$_1$-C$_{10}$ alkylene group.

2. A method for preparing the organosilicon compound of claim 1, comprising the step of reacting a compound having the structural formula (9):

[Chem. 9]

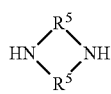

(9)

wherein R$^5$ is as defined above, with a compound having the formula (8):

[Chem. 10]

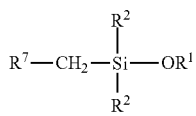

(8)

wherein R$^1$ and R$^2$ are as defined above, and R$^7$ is a leaving group selected from among chlorine, bromine, iodine, methansulfonate, trifluoromethanesulfonate, and p-toluenesulfonate, or a (meth)acryloyloxy group.

3. A curable composition comprising the organosilicon compound of claim 1.

4. The curable composition of claim 3, further comprising a curing catalyst.

5. The curable composition of claim 4 wherein the curing catalyst is an amine base compound.

6. A coating agent comprising the curable composition of claim 3.

7. An adhesive comprising the curable composition of claim 3.

* * * * *